No. 628,401. Patented July 4, 1899.
G. T. FARNELL.
MONEY HOLDER AND CHANGER.
(Application filed Apr. 4, 1898.)
(No Model.) 4 Sheets—Sheet 1.
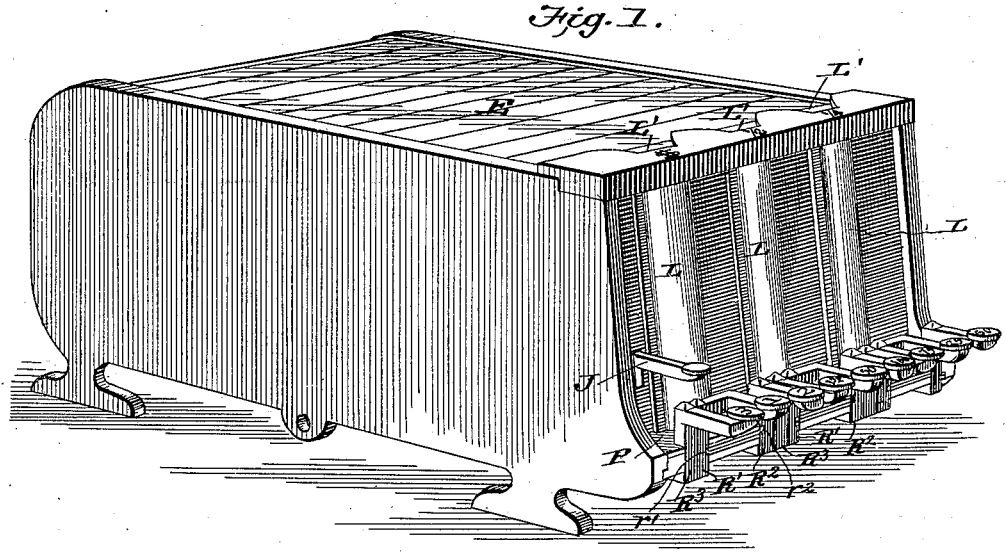
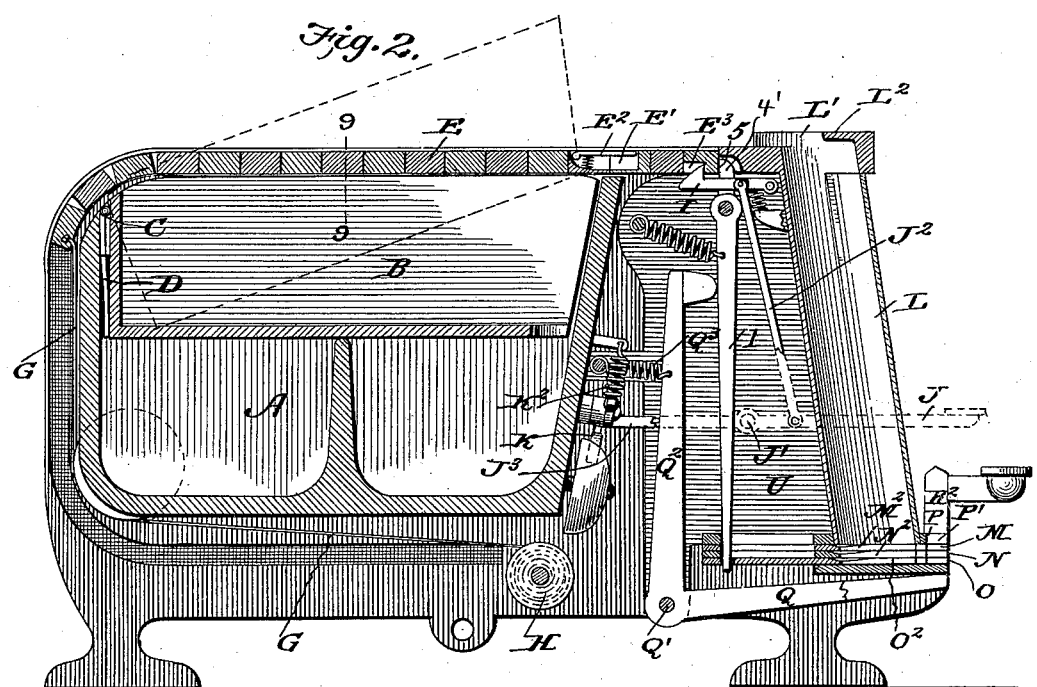
WITNESSES: INVENTOR
G. T. Farnell.
BY
ATTORNEYS.

No. 628,401. Patented July 4, 1899.
G. T. FARNELL.
MONEY HOLDER AND CHANGER.
(Application filed Apr. 4, 1898.)
(No Model.) 4 Sheets—Sheet 2.
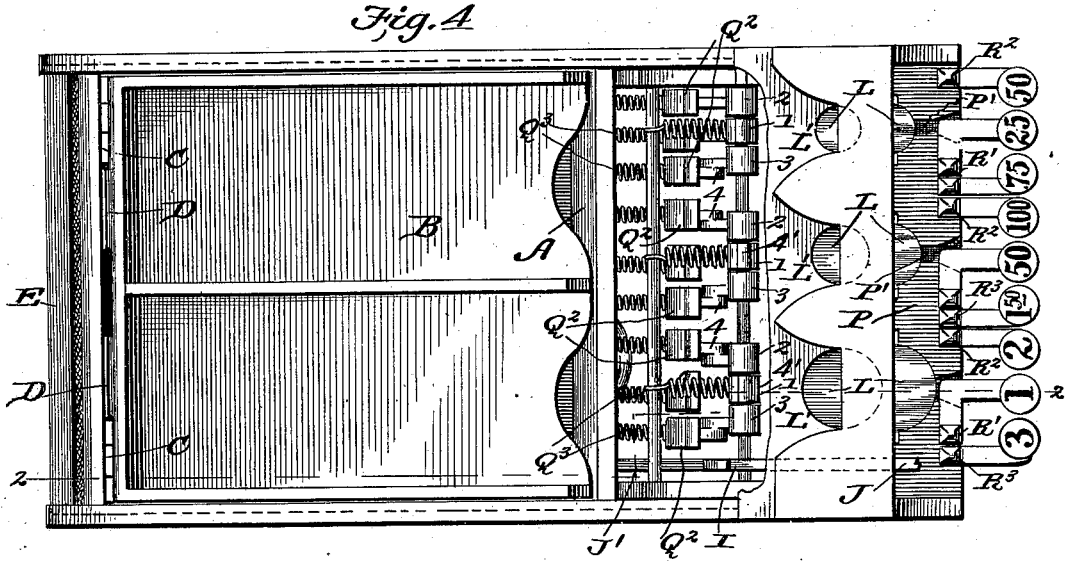
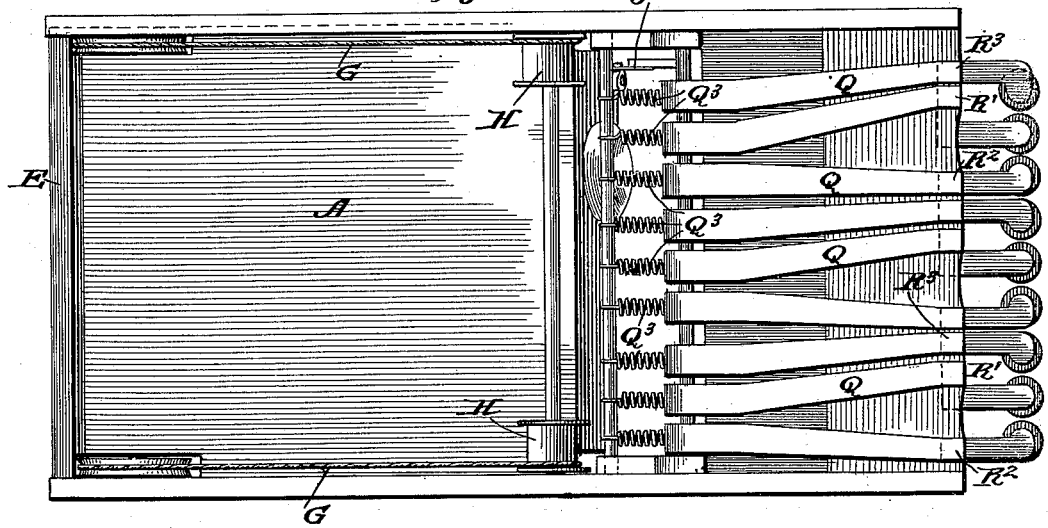
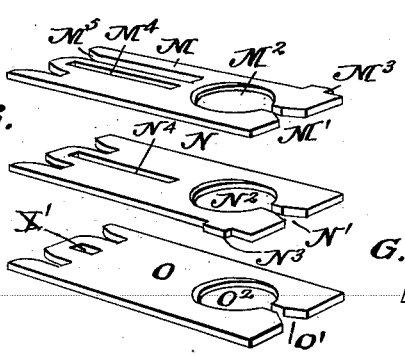
WITNESSES:
M. D. Bloudel
P. B. Turpin
INVENTOR
G. T. Farnell
BY Munn & Co.
ATTORNEYS.

No. 628,401. Patented July 4, 1899.
G. T. FARNELL.
MONEY HOLDER AND CHANGER.
(Application filed Apr. 4, 1898.)
(No Model.) 4 Sheets—Sheet 3.
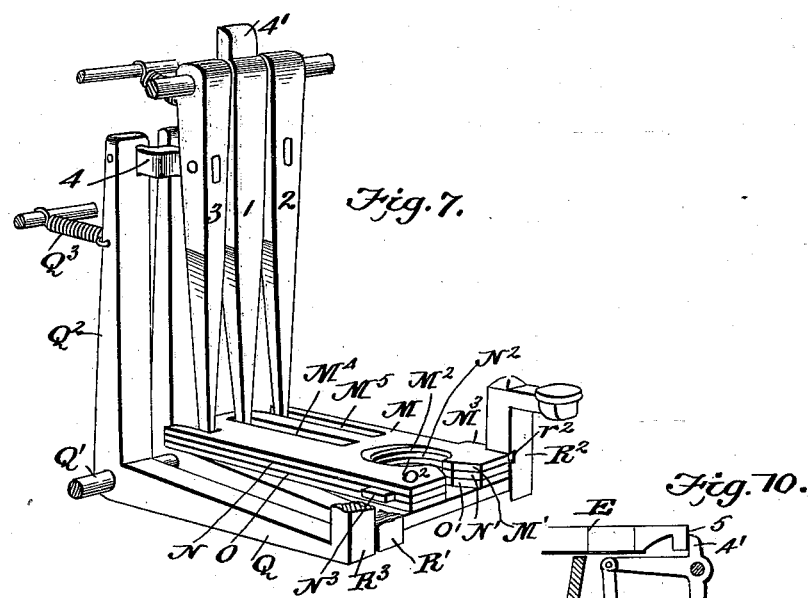
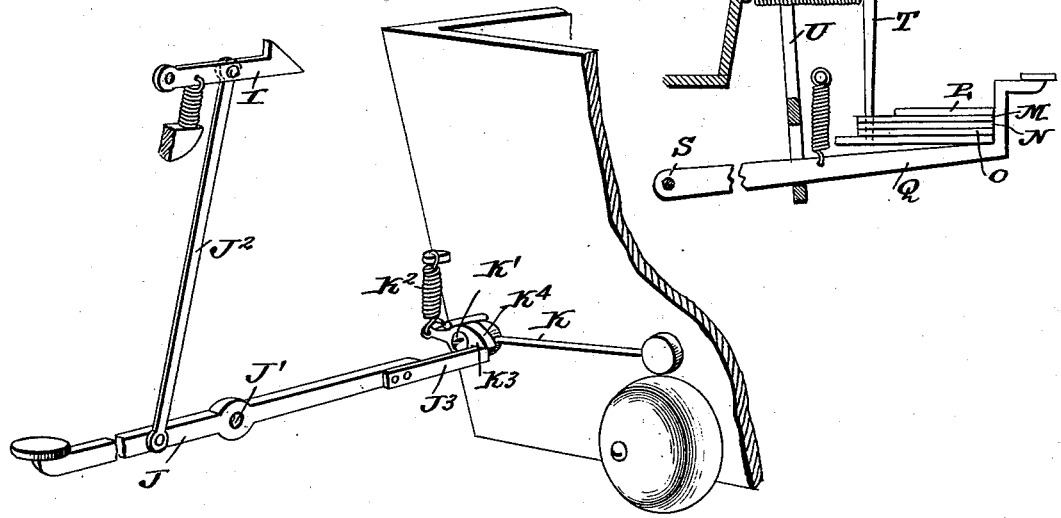
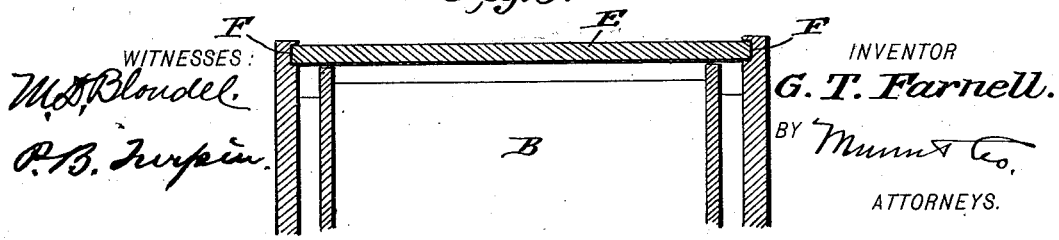
WITNESSES:
INVENTOR
G. T. Farnell.
BY
ATTORNEYS.

No. 628,401. Patented July 4, 1899.
G. T. FARNELL.
MONEY HOLDER AND CHANGER.
(Application filed Apr. 4, 1898.)
(No Model.) 4 Sheets—Sheet 4.
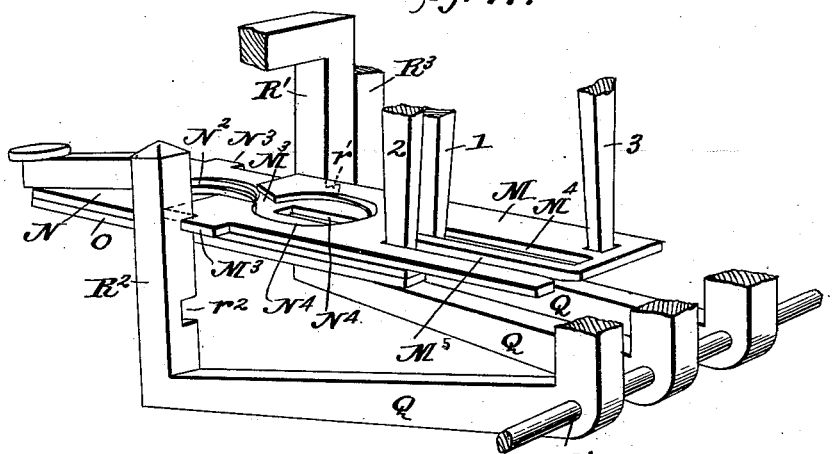
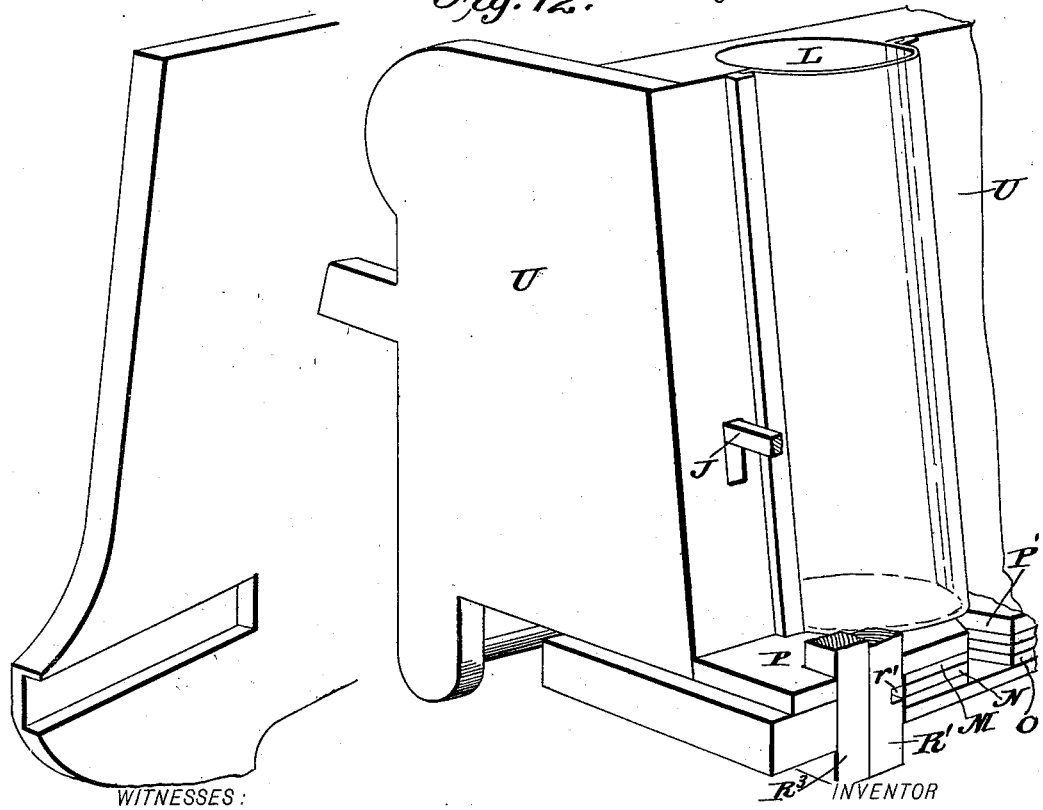

UNITED STATES PATENT OFFICE.

GEORGE THOMAS FARNELL, OF BAYBOROUGH, NORTH CAROLINA, ASSIGNOR OF ONE-FOURTH TO HOWARD L. EDMUNDS, OF NEWPORT NEWS, VIRGINIA.

MONEY HOLDER AND CHANGER.

SPECIFICATION forming part of Letters Patent No. 628,401, dated July 4, 1899.

Application filed April 4, 1898. Serial No. 676,395. (No model.)

*To all whom it may concern:*

Be it known that I, GEORGE THOMAS FARNELL, a resident of Bayborough, in the county of Pamlico and State of North Carolina, have invented certain new and useful Improvements in Money Holders and Changers, of which the following is a full, clear, and exact specification.

My invention is an apparatus for use in holding money and for making change by the delivery of coins through suitable key mechanism, the coin-delivering mechanism for each denomination of coin being adapted for the delivery of one, two, or three such coins, as may be desired; and the invention consists in certain novel constructions and combinations of parts, as will be hereinafter described, and pointed out in the claims.

In the drawings, Figure 1 is a perspective view of an apparatus embodying my improvements. Fig. 2 is a vertical longitudinal section thereof on about line 2 2 of Fig. 4. Fig. 3 is a detail sectional view of the front end of the sliding cover and its latch. Fig. 4 is a top plan view of the apparatus, the cover being removed. Fig. 5 is a bottom plan view of the apparatus. Fig. 6 is a detail perspective view showing the three slides detached and separated. Fig. 7 is a detail perspective view of the slides and the means for operating the same. Fig. 8 is a detail perspective view of the alarm mechanism. Fig. 9 is a detail cross-section on about line 9 9 of Fig. 2. Fig. 10 shows a somewhat different construction for operating the slides, and Figs. 11 and 12 illustrate the detent mechanism for preventing the accidental movement of the slides.

In carrying out my invention I provide a suitable casing, in which is formed a fixed till A for odd coins, packages of money, or other such uses, as may be desired, and in this fixed till I arrange the movable till B, which is hinged at C and has a spring D arranged to act on such hinged end when the till B is released while opening the cover of the apparatus, in which case the till B will rock upward to the position indicated in dotted lines, Fig. 2.

The lid E, which covers the till, is preferably a sectional or slatted lid, as shown, which is arranged to slide in the grooves F of the sides of the casing and has connected with its rear end tapes or straps G, which connect with the spring-actuated roller H, which automatically opens the lid when its latch is released. Near its front edge the lid E is provided with a socket or sockets E', covered by depressible spring-actuated caps $E^2$, which normally coincide with the top plane of the lid and may be depressed by the fingers when it is desired to take hold in the sockets E' for the purpose of drawing the lid forward to closed position. In its under side, near its front edge, the lid E has a seat $E^3$ for the latch I, which is spring-pressed into engagement with the lid and may be released from such engagement by the lid-releasing lever J, which is pivoted at J', is connected by a link $J^2$ with the latch I, whereby to release the latter, and is adapted to sound the alarm preferably by the construction shown in detail in Fig. 8. In this construction the bell-hammer K is pivoted at K' and is actuated by a spring $K^2$ to sound the bell, as will be understood from said figure. This hammer has at $K^3$ a shoulder which is engaged by the edge of the laterally-yielding spring $J^3$ at the rear end of the lever J, and opposite said shoulder $J^3$ the hammer K has a beveled surface $K^4$, which permits the return of the spring $J^3$ past the beveled surface $K^4$, being again in position to raise the hammer after the bell has been sounded. In the operation of this construction when the lever J is depressed it will release the latch I and will sound the bell, as before described.

In the front of the apparatus I provide the coin-chutes L for the coins of different denominations. Manifestly these chutes may be adapted to receive coin of the desired denomination and may be made in any number to adapt the machine for use with any system of coinage which may be in use or be adopted. These chutes L open at their tops onto the top of the casing, and I provide at L' guides which facilitate the filling of the chutes from a pile of coin placed upon the lid and have overlying portions $L^2$, said $L^2$ marked with the respective denomination of each coin-chute.

At their lower ends the chutes are controlled by delivery-slides arranged in series, preferably three for each chute, and the slides of each series overlying each other and being provided with openings coinciding with the bore of their respective chute and registering with each other and with the bore of such chute when the parts are at rest, as shown in Fig. 2. These slides are movable from the position shown in Fig. 2 forward to deliver one, two, or three coins into the hand placed to receive them below and in front of the chute in which the particular slides operate.

The slides M, N, and O may be operated together, or the slide O may be operated alone or jointly with the slide N and independently of the slide M; but the slide M can only be operated with the slides N and O, and the slide N can only be operated jointly with the slide O or with both the slides M and O by reason of the construction hereinafter more fully described. Slots M', N', and O' extend from the front ends of the slides into the openings $M^2$, $N^2$, and $O^2$, and, together with slot P' in the plate P above the front ends of said slides, permit the operator to see the coins in the openings $M^2$, $N^2$, and $O^2$, as will be understood from Fig. 2. At their sides the slides M and N are provided with laterally-extending shoulders $N^3$ and $M^3$, which face toward the front ends of the slides and operate, together with the key-levers, as detents for preventing the accidental movement of the slide N when the slide O is moved or of the slide M when the other two slides are removed, as will be more fully described hereinafter.

The key-levers Q are in the form of bell-cranks pivoted at Q' and having arms $Q^2$, which operate their respective slides through the aid of the rocking levers 1, 2, and 3, to the latter two of which the bell-crank levers are connected, preferably by means of the links 4, as shown in Fig. 7.

I provide a separate key-lever for each slide and arrange them with their keys in front of their respective chutes and above the series of slides which they operate. I support these keys on upright arms R', $R^2$, and $R^3$. The arm R' is provided in line with the slide N with a notch $r'$ for the passage of the shoulder $N^3$ on said slide N, and the arm $R^2$ is provided opposite the slide M with a notch $r^2$ for the passage of the shoulder $M^3$ on the said slide M. When the arms R' and $R^2$ are in normal position, the corresponding shoulders may move forward freely through their notches; but if the arm R' be depressed to throw its slide O forward the notch $r'$ will pass out of register with the slide N, and the shoulder $N^3$ on said slide will by engagement with the depressed arm R' prevent the slide N from being accidentally moved forward by the friction of the slide O or otherwise when not desired. The arm $R^2$ and its notch $r^2$ operate similarly in connection with the slide M and its shoulder $M^3$, as will be readily understood.

To prevent the opening of any of the slides except when the lid is opened, which will cause a sounding of the bell before described, I provide the rocking lever 1 with an extension or portion 4', which is engaged by the cover at 5, so the arm 1 cannot be operated to open its slide O until the lid is opened. It should be understood that the slide O may be opened alone, while the operation of the slides M and N necessarily involve the operation of such slide O, so the locking of the slide O will lock the other slides as well.

The lever 1 connects at its lower end with the slide O, preferably by fitting such end in an opening X' in such slide, as shown, and to prevent such lever from operating the succeeding slides N and M, I provide the latter with longitudinal slots $N^4$ and $M^4$ for the play of the lever 1. In like manner the levers 2 and 3 connect with their respective slides N and M, and the slide M has a longitudinal slot $M^5$, in which the lever 2 plays back and forth. Thus it will be seen that the slide O may be operated without moving the slides N and M and the slide N without moving the slide M; but the operation of slides M and N will effect the operation of the preceding slide or slides. Springs $Q^3$ are provided for retracting the key-levers Q.

In Fig. 10 I show a somewhat different construction for operating the slides, in which the key-levers are pivoted at S, and the rocking levers T, which engage the slides, are made in the form of bell-cranks, having one of their arms connected by links U with the key-lever. Manifestly this construction may be used instead of that shown in the other figures and heretofore described.

In the operation of the invention the key-lever J may be operated as before described to release the automatically-opening lid E, which in turn releases the lever 1, which is employed in operating the slide O. Then the key-levers Q may be operated to deliver one, two, or three coins of the desired denomination. As the lid E opens, it releases the bill-till and such till will lift slightly by means of its actuating-spring, as shown in Fig. 2, and when desired the till B may be further raised to permit access to the fixed till A before described.

In the operation of the detent mechanism when the key-levers are in normal position the slots $r'$ and $r^2$ in the key-levers, which operate, respectively, the first and second slides O and N, will lie in line with the shoulders $N^3$ and $M^3$ of the slides N and M, so such slides may pass freely through the notches or slots unless the said key-lever be depressed; but if the key-lever which operates the slide O be depressed its slot $r'$ will be moved out of register with the shoulder $N^3$, so the said shoulder will abut the said key-lever and will so operate to prevent accidental forward movement of the slide N by the friction of the slide O or otherwise when it is not desired to move the slide N to position to deliver the coin.

In carrying out my invention I make the main frame or casing separate from the supplemental frame or casing U and support the delivery-slides and their operating devices in such supplemental frame, which is adapted, as illustrated in Fig. 12, to be applied bodily to and removed from the main frame or casing, screws, bolts or other suitable fastening devices being provided for holding the supplemental frame in the main frame or casing when desired. In so fitting the frame or casing U to the main casing I arrange the sides of the main casing to extend forward and the casing U to fit between the said forwardly-extended sides, as will be understood from Figs. 1 and 2.

Having thus described my invention, what I claim, and desire to secure by Letters Patent, is—

1. In an apparatus substantially as described the combination of the overlying slides, each, after the first, having lateral shoulders, and the key-levers provided, except the last, with notches through which the shoulders in the preceding slides may play in the normal position of such key-levers substantially as set forth.

2. The combination of the overlying delivery-slides, each, after the first, having lateral forwardly-facing shoulders and the key-levers arranged to operate the slides and provided with upright portions in advance of such slides such upright portions having notches through which the shoulders in the preceding slides play in the normal position of the key-levers substantially as set forth.

3. The combination of the overlying delivery-slides, and the key-levers for operating said slides and having upright portions extending on opposite sides of the slides substantially as set forth.

4. An apparatus substantially as described comprising the main frame or casing having the sides extended forwardly, the supplemental frame or casing fitted between said extensions of the sides and applicable bodily to and removable from the main frame or casing and the delivery-slides and their operating devices carried by the supplemental frame substantially as set forth.

5. In an apparatus substantially as described the combination of the series of overlying slides, and the separate levers engaging the same, the several slides being provided with longitudinal slots for the play of the levers leading to the preceding slides substantially as set forth.

6. In an apparatus substantially as described the combination of the series of overlying slides, means for operating the first of such slides, devices for operating the succeeding slides and whereby to effect the movement of the preceding slide or slides by the movement of such succeeding ones, and devices whereby the means for operating the first slide may be locked from movement and may be released to operate substantially as set forth.

7. In an apparatus substantially as described the combination of the rocking levers, the overlying slides arranged for operation by said levers, the lid arranged to lock said levers from movement and when opened to release the same, and the key-levers for operating said rocking levers substantially as set forth.

8. In an apparatus substantially as described the combination of the coin-delivery devices, means for operating same, the self-opening lid arranged to lock said operating means, means for locking said lid, and devices for releasing said locking means substantially as set forth.

9. In an apparatus substantially as described the combination of the frame or casing the till therein, the self-opening cover arranged to cover said till and hold the same depressed and means for raising said till when released by the lid substantially as set forth.

10. In an apparatus substantially as described the combination of the main frame or casing and the sliding cover having a socket or sockets forming finger-holes, and spring-actuated caps for closing the same substantially as set forth.

11. In an apparatus substantially as described the combination of the self-opening cover or lid, the latch for locking the same closed, the lever by which to release said latch, and the alarm arranged for operation by said lever substantially as set forth.

12. In an apparatus substantially as described, the combination of the overlying slides movable longitudinally and the levers for operating the slides, the slides overlying that operated by any given lever being slotted for the passage of such lever to the slide it operates substantially as set forth.

13. An apparatus substantially as described comprising a frame or casing a till adapted to hold bills, a coin chute or chutes, means whereby to deliver coins therefrom, a cover or lid movable over the bill-till, a latch for locking said cover, means whereby the cover when closed will prevent the operation of the coin-delivering devices, and means whereby to release the cover whereby to expose the contents of the bill-till, and also to free the coin-delivering devices whereby the latter may be operated all substantially as set forth.

GEORGE THOMAS FARNELL.

Witnesses:
J. P. STRINGFIELD,
J. B. BLACK.